(12) United States Patent
Kim et al.

(10) Patent No.: US 11,406,962 B2
(45) Date of Patent: Aug. 9, 2022

(54) SUPER ABSORBENT POLYMER AND METHOD FOR PRODUCING SAME

(71) Applicant: LG Chem, Ltd., Seoul (KR)

(72) Inventors: Su Jin Kim, Daejeon (KR); Dae Woo Nam, Daejeon (KR); Tae Hwan Jang, Daejeon (KR); Jun Kyu Kim, Daejeon (KR); Bo Hyun Seong, Daejeon (KR); Seon Jung Jung, Daejeon (KR); Ji Yoon Jeong, Daejeon (KR)

(73) Assignee: LG Chem, Ltd.

( * ) Notice: Subject to any disclaimer, the term of this patent is extended or adjusted under 35 U.S.C. 154(b) by 174 days.

(21) Appl. No.: 16/315,059

(22) PCT Filed: Oct. 27, 2017

(86) PCT No.: PCT/KR2017/012013
§ 371 (c)(1),
(2) Date: Jan. 3, 2019

(87) PCT Pub. No.: WO2018/080238
PCT Pub. Date: May 3, 2018

(65) Prior Publication Data
US 2019/0308171 A1 Oct. 10, 2019

(30) Foreign Application Priority Data
Oct. 28, 2016 (KR) ................. 10-2016-0141764

(51) Int. Cl.
| | | |
|---|---|---|
| B01J 20/26 | (2006.01) | |
| B01J 20/02 | (2006.01) | |
| B01J 20/08 | (2006.01) | |
| B01J 20/28 | (2006.01) | |
| B01J 20/30 | (2006.01) | |
| C08K 3/30 | (2006.01) | |
| C08J 3/12 | (2006.01) | |
| C08J 3/24 | (2006.01) | |
| C08J 3/20 | (2006.01) | |
| C08K 5/00 | (2006.01) | |
| C08K 3/22 | (2006.01) | |

(52) U.S. Cl.
CPC ......... B01J 20/267 (2013.01); B01J 20/0248 (2013.01); B01J 20/0281 (2013.01); B01J 20/08 (2013.01); B01J 20/28004 (2013.01); B01J 20/28016 (2013.01); B01J 20/3021 (2013.01); B01J 20/3085 (2013.01); C08J 3/126 (2013.01); C08J 3/20 (2013.01); C08K 3/245 (2013.01); C08K 3/22 (2013.01); C08K 3/30 (2013.01); C08K 5/00 (2013.01); *C08J 2333/08* (2013.01); *C08J 2333/10* (2013.01)

(58) Field of Classification Search
None
See application file for complete search history.

(56) References Cited

U.S. PATENT DOCUMENTS

| | | | |
|---|---|---|---|
| 4,771,105 | A | 9/1988 | Shirai et al. |
| 4,783,510 | A | 11/1988 | Saotome |
| 6,605,673 | B1 | 8/2003 | Mertens et al. |
| 6,620,889 | B1 | 9/2003 | Mertens et al. |
| 2004/0214946 | A1 | 10/2004 | Smith et al. |
| 2009/0215617 | A1 | 8/2009 | Kimura et al. |
| 2010/0286287 | A1 | 11/2010 | Walden |
| 2011/0224361 | A1 | 9/2011 | Daniel et al. |
| 2013/0172180 | A1 | 7/2013 | Naumann et al. |
| 2013/0187089 | A1 | 7/2013 | Daniel et al. |
| 2016/0208035 | A1 | 7/2016 | Ryu et al. |
| 2016/0220980 | A1 | 8/2016 | Kim et al. |
| 2017/0073478 | A1 | 3/2017 | Joo et al. |

FOREIGN PATENT DOCUMENTS

| | | |
|---|---|---|
| CN | 101050251 A | 10/2007 |
| CN | 101278006 A | 10/2008 |
| CN | 102702418 A | 10/2012 |
| CN | 104024291 A | 9/2014 |
| CN | 104788871 A | 7/2015 |
| EP | 1357133 A2 | 10/2003 |
| EP | 1770113 A1 | 4/2007 |

(Continued)

OTHER PUBLICATIONS

Translation of CN 104788871 dated Jul. 2015 (Year: 2015).*
Buchholz, Frederic L., et al., "Modern Superabsorbent Polymer Technology." John Wiley & Sons, Inc., 1998, p. 161.
Odian, George, "Princples of Polymerization." Second Edition, John Wiley & Sons, Inc., 1981, p. 203.
Schwalm, Reinhold, "UV Coatings: Basics, Recent Developments and New Applications." Elsevier Science, Dec. 21, 2006, p. 115.
Search report from International Application No. PCT/KR2017/012013, dated Jun. 28, 2018.
Chinese Search Report for Application No. 201780034266.X dated Sep. 29, 2020, 2 pages.

(Continued)

*Primary Examiner* — Tanisha Diggs
(74) *Attorney, Agent, or Firm* — Lerner, David, Littenberg, Krumholz & Mentlik, LLP

(57) ABSTRACT

The present invention relates to a superabsorbent polymer which exhibits more improved liquid permeability while maintaining excellent absorption performance, and suppresses aggregation and caking of particles even under high temperature/high humidity conditions, and to a method for producing the same. The super absorbent polymer comprises: a base polymer powder including a first crosslinked polymer of a water-soluble ethylenically unsaturated monomer having at least partially neutralized acidic groups; and a surface crosslinked layer formed on the base polymer powder and including a second cross-linked polymer in which the first cross-linked polymer is further crosslinked via a surface cross-linking agent, wherein the super absorbent polymer includes aluminum sulfate dispersed in the surface crosslinked layer and alumina dispersed on the surface crosslinked layer.

15 Claims, No Drawings

(56) References Cited

FOREIGN PATENT DOCUMENTS

| EP | 3056268 A1 | 8/2016 |
|---|---|---|
| JP | S59080459 A | 5/1984 |
| JP | 2009510177 A | 3/2009 |
| JP | 2012509377 A | 4/2012 |
| JP | 2012530832 A | 12/2012 |
| KR | 940000965 B1 | 2/1994 |
| KR | 20140107491 A | 9/2014 |
| KR | 20140144259 A | 12/2014 |
| KR | 101596623 B1 | 2/2016 |
| KR | 20160016714 A | 2/2016 |
| KR | 20160068768 A | 6/2016 |
| KR | 20160117180 A | 10/2016 |
| WO | 2002053199 A1 | 7/2002 |
| WO | 2004069915 A2 | 8/2004 |
| WO | 2004096303 A2 | 11/2004 |
| WO | 2004096304 A1 | 11/2004 |

OTHER PUBLICATIONS

Third Party Observation for PCT/KR2017/012013 submitted Feb. 27, 2019.

* cited by examiner

SUPER ABSORBENT POLYMER AND METHOD FOR PRODUCING SAME

CROSS-REFERENCE TO RELATED APPLICATION

This application is a national phase entry under 35 U.S.C. § 371 of International Application No. PCT/KR2017/012013, filed Oct. 27, 2017, which claims priority to Korean Patent Application No. 10-2016-0141764, filed Oct. 28, 2016, the disclosures of which are incorporated herein by reference.

TECHNICAL FIELD

The present invention relates to a super absorbent polymer which exhibits more improved liquid permeability while basically maintaining excellent absorption performance, and suppresses aggregation and caking of particles even under high temperature/high humidity conditions, and to a method for producing the same.

BACKGROUND

Super absorbent polymer (SAP) is a synthetic polymer material capable of absorbing moisture from about 500 to about 1,000 times its own weight, and each manufacturer has denominated it as different names such as SAM (Super Absorbency Material), AGM (Absorbent Gel Material) or the like. Such super absorbent polymers started to be practically applied in sanitary products, and now they are widely used for production of hygiene products such as paper diapers for children or sanitary napkins, water retaining soil products for gardening, water stop materials for the civil engineering and construction, sheets for raising seedling, fresh-keeping agents for food distribution fields, materials for poultice or the like.

In most cases, these super absorbent polymers have been widely used in the field of hygienic materials such as diapers or sanitary napkins. In such hygienic materials, the super absorbent polymer is generally contained in a state of being spread in the pulp. In recent years, however, continuous efforts have been made to provide hygienic materials such as diapers having a thinner thickness. As a part of such efforts, the development of so-called pulpless diapers and the like in which the content of pulp is reduced or pulp is not used at all is being actively advanced.

As described above, in the case of hygienic materials in which the pulp content is reduced or the pulp is not used, a superabsorbent polymer is contained at a relatively high ratio and these super absorbent polymer particles are inevitably contained in multiple layers in the hygienic materials. In order for the whole super absorbent polymer particles contained in the multiple layers to absorb liquid such as urine more efficiently, not only the super absorbent polymer needs to basically exhibit high absorption capacity and absorption rate, but also it needs to exhibit more improved liquid permeability. That is, the superabsorbent polymer should exhibit more improved liquid permeability, so the super absorbent polymer particles of the surface layer which first comes in contact with the liquid such as urine are absorbed and allow to pass the remaining liquid effectively and quickly.

Accordingly, recently, various attempts have been made to develop a highly improved super absorbent polymer, but these technical requirements are not yet sufficiently satisfied.

On the other hand, since the super absorbent polymer is contained in a hygienic material such as a diaper, it is often exposed under high temperature/high humidity conditions. However, as such super absorbent polymer is provided in the form of fine crosslinked particles exhibiting high absorbency, aggregation and caking (solidification) of particles often occur when exposed under high temperature/high humidity conditions. When these aggregation and solidification occur, it may cause a decrease in processability such an increase in load during manufacturing and use process, and also it may cause difficulties in using the super absorbent polymer.

Previously, attempts have been made to treat inorganic particles such as silica on the surface of particles of the super absorbent polymer to reduce aggregation and caking of the particles, but the technical requirements concerning this have not been sufficiently satisfied.

TECHNICAL PROBLEM

The present invention provides a super absorbent polymer which exhibits more improved liquid permeability while basically maintaining excellent absorption performance, and suppresses aggregation and caking of particles even under high temperature/high humidity conditions, and a method for producing the same.

TECHNICAL SOLUTION

The present invention provides a super absorbent polymer comprising: a base polymer powder including a first crosslinked polymer of a water-soluble ethylenically unsaturated monomer having at least partially neutralized acidic groups; and a surface crosslinked layer formed on the base polymer powder and including a second crosslinked polymer in which the first crosslinked polymer is further crosslinked via a surface crosslinking agent, wherein the super absorbent polymer includes aluminum sulfate dispersed in the surface crosslinked layer and alumina dispersed on the surface crosslinked layer.

The present invention also provides a super absorbent polymer comprising: a base polymer powder including a first crosslinked polymer of a water-soluble ethylenically unsaturated monomer having at least partially neutralized acidic groups; and a surface crosslinked layer formed on the base polymer powder and including a second crosslinked polymer in which the first crosslinked polymer is further crosslinked via a surface crosslinking agent, wherein the super absorbent polymer includes aluminum sulfate dispersed in the surface crosslinked layer and alumina dispersed on the surface crosslinked layer, wherein a permeability measured and calculated by the method of the following Equation 1 is 10 to 70 seconds, and an anti-caking efficiency of the following Equation 2 is 75% to 100%:

$$\text{Permeability (sec)} = T_S - _0 \quad \text{[Equation 1]}$$

in Equation 1, $T_S$ (unit:sec) means the time required for allowing a 0.9% saline (NaCl) solution to permeate a saline-absorbed super absorbent polymer under a load of 0.3 psi, wherein the saline-absorbed super absorbent polymer is prepared by swelling 0.2 g of super absorbent polymer with the 0.9% saline solution for 30 minutes, and $T_0$ (unit:sec) means the time required for allowing the 0.9% saline solution to permeate under the load of 0.3 psi in the absence of the saline-absorbed super absorbent polymer, and $$\text{Anti-caking efficiency (\%)} = [W_6(g)/W_0(g)]*100 \quad \text{[Equation 2]}$$

in Equation 2, $W_0(g)$ is an initial weight(g) of the super absorbent polymer, and $W_6(g)$ is the amount (g) at which the super absorbent polymer falls after uniformly applying to a 10 cm diameter flask dish, keeping for 10 minutes in a constant-temperature and constant-humidity chamber which is maintained at a temperature of 40±3° C. and a humidity of 80±3%, and then reversing a flask dish on a filter paper and tapping three times.

In addition, the present invention provides a method for producing a super absorbent polymer comprising the steps of: performing crosslinking polymerization of a water-soluble ethylenically unsaturated monomer having at least partially neutralized acidic groups in the presence of an internal crosslinking agent to form a hydrogel polymer containing a first crosslinked polymer; drying, pulverizing and classifying the hydrogel polymer to form a base polymer power; heat-treating and surface-crosslinking the base polymer powder in the presence of a surface crosslinking solution containing aluminum sulfate and a surface crosslinking agent to form a super absorbent polymer particle; and dry mixing alumina on the super absorbent polymer particle.

DETAILED DESCRIPTION OF THE EMBODIMENTS

Hereinafter, a super absorbent polymer according to a specific embodiment of the present invention and a production method thereof will be described in detail. However, this is merely presented as an example of the present invention, and will be apparent to those skilled in the art that the scope of the present invention is not limited to these embodiments, and various modifications can be made to the embodiments within the scope of the present invention.

In addition, unless stated otherwise throughout this specification, the term "comprises" or "contains" refers to including any constituent element (or constituent component) without particular limitation, and it cannot be interpreted as a meaning of excluding an addition of other constituent element (or constituent component).

The term "on the (super absorbent polymer particle)" may mean being formed on the surface of the particle, or being formed in a state in which a part is embedded in the surface of the particle and a part is exposed on the surface of the particle.

In the distinguishing concepts, the term "in the (super absorbent polymer particle)" may mean being formed in a state completely embedded in the layer, or being formed in a state in which at least a part is embedded in the layer.

On the other hand, according to one embodiment of the invention, there is provided a super absorbent polymer comprising: a base polymer powder including a first crosslinked polymer of a water-soluble ethylenically unsaturated monomer having at least partially neutralized acidic groups; and a surface crosslinked layer formed on the base polymer powder and including a second crosslinked polymer in which the first crosslinked polymer is further crosslinked via a surface crosslinking agent, wherein the super absorbent polymer includes aluminum sulfate dispersed in the surface crosslinked layer and alumina dispersed on the surface crosslinked layer.

The super absorbent polymer of one embodiment can be obtained by a production method described below, for example, a production method of performing a surface crosslinking using a surface crosslinking solution containing a predetermined aluminum salt such as aluminum sulfate, and then dry mixing the alumina, or the like. Accordingly, the super absorbent polymer of one embodiment may have a structure in which aluminum sulfate is uniformly dispersed in the surface crosslinked layer, and have a structure in which alumina (particles) are uniformly dispersed on the surface crosslinked layer.

As a result of continuous studies and experiments, the present inventors have found that the super absorbent polymer particles of one embodiment having such structural characteristics can excellently maintain the basic absorption characteristics and absorption rate such as a centrifuge retention capacity, an absorption under pressure and a vortex removal time, and also exhibits more improved liquid permeability and anti-caking (solidification preventing) properties than previously known ones. Such improved liquid permeability and anti-caking properties can be defined by physical properties described below such as a permeability and an anti-caking efficiency.

In particular, it has been found that the super absorbent polymer of one embodiment can exhibit improved liquid permeability and/or anti-caking properties as compared with an existing super absorbent polymer obtained by dry mixing other inorganic particles such as silica, or an existing super absorbent polymer obtained by incorporating different kinds of aluminum salts in the surface cross-linking layer.

Such improved liquid permeability is expected to be expressed because the strength of the super absorbent polymer particles can be further improved as a whole as aluminum sulfate is uniformly contained in the surface crosslinked layer, and thereby the form of particles may be maintained even after liquid absorption. In addition, it is considered that the alumina is well maintained on the particle surface as compared with other inorganic particles such as silica, and thereby aggregation and caking of particles can be suppressed more effectively.

Thus, according to one embodiment, there may be provided a super absorbent polymer that exhibits more improved liquid permeability and anti-caking properties along with excellent absorption performance, and such a super absorbent polymer can be effectively used for hygienic materials having a reduced pulp content.

In the super absorbent polymer of one embodiment, the base polymer powder may have the component and composition equivalent to those of the base polymer powder of a general super absorbent polymer. Such base polymer powder may include a first crosslinked polymer of an unsaturated monomer having at least partially neutralized acidic groups, such as acrylic acid and its salt, and can be produced according to the production method of another embodiment described below.

However, these base polymer powders can be produced under the production conditions of the production method described below, for example, the kind and content of the internal crosslinking agent, the polymerization conditions, and the like can be controlled so that a centrifuge retention capacity (CRC) for a physiological saline solution (0.9 wt % aqueous sodium chloride solution) for 30 minutes is 29 g/g or more, and a vortex removal time is 27 seconds or more.

A base polymer powder is prepared so as to satisfy these physical properties, and such base polymer powder is subjected to a predetermined surface crosslinking process including aluminum sulfate and a dry mixing process of alumina or the like to obtain a super absorbent polymer of one embodiment. Thus, the super absorbent polymer of one embodiment can exhibit superior physical properties, for example, superior absorption performance, or more improved liquid permeability and/or anti-caking properties.

On the other hand, since the structure of the base polymer powder excluding this is equivalent to the base polymer powder of ordinary super absorbent polymer, additional explanation relating thereto will be omitted.

In the super absorbent polymer of one embodiment, the surface crosslinked layer may be formed using a surface crosslinking agent comprising at least one selected from the group consisting of a polyol-based compound, an alkylene carbonate-based compound, and a polyvalent epoxy-based compound. Such surface crosslinking agent may be further crosslinked with a first crosslinking polymer on the surface of the base polymer powder to form a surface crosslinking layer. In such surface crosslinking layer, aluminum sulfate may be contained in a uniformly dispersed state.

The kind of the surface crosslinking agent is not particularly limited, and for example, polyvalent epoxy compound such as ethylene glycol diglycidyl ether, polyethylene glycol diglycidyl ether, glycerol polyglycidyl ether, propylene glycol diglycidyl ether or polypropylene glycol diglycidyl ether; alkylene carbonate-based compound such as ethylene carbonate or propylene carbonate; or polyol-based compound such as ethylene glycol, diethylene glycol, propylene glycol, triethylene glycol, tetraethylene glycol, propanediol, dipropylene glycol, polypropylene glycol, glycerin, polyglycerin, butanediol, heptanediol, hexanediol trimethylolpropane, pentaerythritol or sorbitol may be used without particular limitation.

However, when the surface crosslinked layer is formed by using together with aluminum sulfate, a polyvalent epoxy-based compound such as ethylene glycol diglycidyl ether may be more suitably used as the surface crosslinking agent so as to further improve the liquid permeability and the like of the super absorbent polymer.

Further, the super absorbent polymer of the embodiment may further include alumina dispersed in the surface crosslinked layer. By including alumina together with aluminum sulfate even in the surface crosslinking layer, the liquid permeability and the like of the super absorbent polymer can be further improved.

On the other hand, as alumina which is dispersed on the surface crosslinked layer or optionally contained in the surface crosslinked layer, for example, a highly dispersible fumed alumina having a specific surface area of 80 m²/g or more, or 80 m²/g to 180 m²/g can be suitably used. Alumina satisfying these properties (for example, alumina marketed under the trade name AEROXIDE Alu series) can be commercially obtained and used. The liquid permeability and/or anti-caking properties of the super absorbent polymer can be further improved by using such alumina.

Moreover, in the super absorbent polymer of one embodiment, the aluminum sulfate may be contained in an amount of 0.02 to 0.3 part by weight based on 100 parts by weight of the base polymer powder. When the content range of this aluminum sulfate is too small, the liquid permeability and/or the anti-caking properties of the super absorbent polymer may be insufficient. When the content is excessively large, the crosslinked structure of the surface crosslinked layer is not properly formed, and rather the physical properties of the super absorbent polymer may be lowered as a whole.

Further, the alumina optionally contained in the surface crosslinking layer together with the aluminum sulphate may be contained in an amount of 0.005 to 0.1 part by weight based on 100 parts by weight of the base polymer powder, and the alumina dispersed on the surface crosslinked layer may be contained in an amount of 0.03 to 0.2 part by weight based on 100 parts by weight of the base polymer powder. By satisfying such a content range, it is possible to suppress the deterioration of the physical properties of the super absorbent polymer, while more effectively improving the liquid permeability and the anti-caking properties of the super absorbent polymer.

Meanwhile, the above-mentioned super absorbent polymer can exhibit excellent liquid permeability, and this excellent liquid permeability can be defined by a permeability of 10 to 70 seconds or 15 to 68 seconds measured and calculated by the method of the following Equation 1:

$$\text{Permeability (sec)} = T_S - T_0 \quad \text{[Equation 1]}$$

in Equation 1, $T_S$ (unit:sec) means the time required for allowing a 0.9% saline (NaCl) solution to permeate a saline-absorbed super absorbent polymer under a load of 0.3 psi, wherein the saline-absorbed super absorbent polymer is prepared by swelling 0.2 g of super absorbent polymer with the 0.9% saline solution for 30 minutes, and $T_0$ (unit:sec) means the time required for allowing the 0.9% saline solution to permeate under the load of 0.3 psi in the absence of the saline-absorbed super absorbent polymer.

The permeability is an index representing how well a saline solution (0.9% NaCl aqueous solution) permeates the swollen super absorbent polymer. This is evaluated by measuring the time taken for 0.9% saline solution to permeate after swelling 0.2 g of the super absorbent polymer powder for 30 minutes and then applying a load of 0.3 psi, in accordance with the method described in the literature (Buchholz, F. L. and Graham, A. T., "Modern Super absorbent polymer Technology," John Wiley & Sons (1998), page 161). A more detailed method of measuring the permeability will be described in detail in the embodiments described below.

Further, in the super absorbent polymer of one embodiment describe above, an anti-caking efficiency of the following Equation 2 may be 75% to 100%. When maintained under the high-temperature/high-humidity conditions as described above, it can exhibit excellent anti-caking properties which hardly cause aggregation and solidification (caking).

$$\text{Anti-caking efficiency (\%)} = [W_6(g)/W_0(g)]*100 \quad \text{[Equation 2]}$$

in Equation 2, $W_0(g)$ is an initial weight(g) of the super absorbent polymer, and $W_6(g)$ is the amount (g) at which the super absorbent polymer falls after uniformly applying to a 10 cm diameter flask dish, keeping for 10 minutes in a constant-temperature and constant-humidity chamber which is maintained at a temperature of 40±3° C. and a humidity of 80±3%, and then reversing a flask dish on a filter paper and tapping three times.

In addition, the super absorbent polymer can basically exhibit excellent absorption performance and absorption rate. More specifically, the super absorbent polymer may have a centrifuge retention capacity (CRC) for a physiological saline solution (0.9 wt % aqueous sodium chloride solution) for 30 minutes of 28 g/g to 36 g/g, or 29 g/g to 35 g/g.

In this case, the centrifuge retention capacity (CRC) can be calculated by the following Equation 3 after absorbing the super absorbent polymer to a physiological saline solution over 30 minutes:

$$CRC(g/g) = \{[W_2(g) - W_1(g) - W_0(g)]/W_0(g)\}$$ [Equation 3]

in Equation 3, $W_0(g)$ is an initial weight(g) of the super absorbent polymer, $W_1(g)$ is the weight of the device not including the super absorbent polymer, measured after immersing and absorbing the same into a physiological saline solution for 30 minutes and then dehydrating the same by using a centrifuge at 250G for 3 minutes, and $W_2(g)$ is the weight of the device including the super absorbent polymer, measured after immersing and absorbing the super absorbent polymer into a physiological saline solution at room temperature for 30 minutes and then dehydrating the same by using a centrifuge at 250G for 3 minutes.

Further, the super absorbent polymer can exhibit excellent absorbency under pressure (0.3 AUP) for a physiological saline solution (0.9 wt % sodium chloride aqueous solution) under 0.3 psi for 1 hour of 20 to 33 g/g, or 24 to 30 g/g. Further, the super absorbent polymer can exhibit excellent absorbency under pressure (0.7 AUP) for a physiological saline solution under 0.7 psi for 1 hour of 10 to 25 g/g, or 10 to 22 g/g. Thereby, it can exhibit excellent absorption performance even under high load.

Such absorbency under pressure (AUP) may be calculated according to the following Equation 4, after absorbing the super absorbent polymer in a physiological saline solution under a load of about 0.7 psi over 1 hour.

$$AUP(g/g) = [W_4(g) - W_3(g)]/W_0(g)$$ [Equation 4]

in Equation 4, $W_0(g)$ is an initial weight (g) of the super absorbent polymer, $W_3(g)$ is the total sum of a weight of the super absorbent polymer and a weight of the device capable of providing a load to the super absorbent polymer, and $W_4(g)$ is the total sum of a weight of the super absorbent polymer and a weight of the device capable of providing a load to the super absorbent polymer, after absorbing a physiological saline solution to the super absorbent polymer under a load (0.3 psi or 0.7 psi) for 1 hour.

Additionally, the super absorbent polymer of one embodiment may have a vortex removal time of 25 to 35 seconds, together with the above-described centrifuge retention capacity and the like. Such a vortex removal time means the time during which a vortex of the liquid disappears due to fast absorption when the super absorbent polymer is added to the physiological saline and stirred. This can define a fast absorption rate of the super absorbent polymer.

After the super absorbent polymer is added to a physiological saline (0.9 wt % NaCl solution) under stirring, the vortex removal time can be calculated by a method of measuring the amount of time until a vortex of the liquid caused by the stirring disappears and a smooth surface is formed.

Meanwhile, the super absorbent polymer of one embodiment described above can be typically obtained by performing a crosslinking polymerization of a water-soluble ethylenically unsaturated monomer having at least partially neutralized acidic groups, such as a mixture of acrylic acid and its sodium salt in which at least some carboxylic acid has been neutralized with sodium salt or the like, in the presence of an internal crosslinking agent. More specifically, the super absorbent polymer can be obtained by performing a crosslinking polymerization of said monomer in the presence of an internal crosslinking agent to obtain a base polymer powder, and then surface-crosslinking the base polymer powder with a surface crosslinking solution containing a surface crosslinking agent and aluminum sulfate, and then dry-mixing alumina or the like.

More specifically, by controlling the type and content of the internal crosslinking agent and the polymerization conditions, for example, a base polymer powder that satisfies a centrifuge retention capacity (CRC) of 29 g/g or more and a vortex removal time of 27 seconds or more is obtained, and then a surface crosslinking step and a dry mixing step thereon are carried out, thereby obtaining the super absorbent polymer of one embodiment exhibiting the above excellent physical properties.

In this regard, according to another embodiment of the invention, there is provided a method for producing a super absorbent polymer comprising the steps of: performing crosslinking polymerization of a water-soluble ethylenically unsaturated monomer having at least partially neutralized acidic groups in the presence of an internal crosslinking agent to form a hydrogel polymer containing a first crosslinked polymer; drying, pulverizing and classifying the hydrogel polymer to form a super absorbent polymer powder; heat-treating and surface-crosslinking the base polymer powder in the presence of a surface crosslinking solution containing aluminum sulfate and a surface crosslinking agent, and dry mixing alumina on the super absorbent polymer powder.

Hereinafter, one embodiment of the production method of the super absorbent polymer will be described in detail for each step.

First, in the above-mentioned production method, the hydrogel polymer can be formed by performing crosslinking polymerization of a water-soluble ethylenically unsaturated monomer in the presence of an internal crosslinking agent.

In this case, the water-soluble ethylenically unsaturated monomer may include at least one selected from the group consisting of anionic monomers of acrylic acid, methacrylic acid, maleic anhydride, fumaric acid, crotonic acid, itaconic acid, 2-acryloylethanesulfonic acid, 2-methacryloylethanesulfonic acid, 2-(meth)acryloylpropanesulfonic acid or 2-(meth)acrylamido-2-methylpropanesulfonic acid, and their salts; non-ionic, hydrophilic group-containing monomers of (meth)acrylamide, N-substituted (meth)acrylate, 2-hydroxyethyl(meth)acrylate, 2-hydroxypropyl(meth)acrylate, methoxypolyethylene glycol(meth)acrylate or polyethylene glycol (meth)acrylate; and amino group-containing unsaturated monomers of (N,N)-dimethylaminoethyl(meth) acrylate or (N,N)-dimethylaminopropyl(meth)acrylamide, and their quaternary product. Among them, acrylic acid or a salt thereof, for example, an alkali metal salt such as acrylic acid and/or a sodium salt thereof having at least partially neutralized acrylic acids can be used, and the use of these monomers enables production of a super absorbent polymer having more excellent physical properties.

In the case of using acrylic acid and its alkali metal salt as a monomer, the monomer can be used by neutralizing acrylic acid with a basic compound such as caustic soda (NaOH). In this case, a degree of neutralization of the water-soluble ethylenically unsaturated monomer may be adjusted to 50 to 95%, or 70 to 85%. Within this range, it is possible to provide a super absorbent polymer having excellent centrifuge retention capacity without fear of precipitation during neutralization.

In the monomer mixture containing the water-soluble ethylenically unsaturated monomer, the concentration of the water-soluble ethylenically unsaturated monomer may be 20 to 60% by weight or 40 to 50% by weight based on the total amount of the monomer mixture including the respective raw materials and solvents described below, which may be appropriately adjusted in consideration of polymerization time, the reaction conditions and the like. However, when the concentration of the monomer is excessively low, the yield of the super absorbent polymer may be lowered, which may cause a problem in economic efficiency. Conversely, when the concentration is excessively high, a part of the monomer may precipitate or the pulverization efficiency may be lowered upon pulverization of the polymerized hydrogel polymer, which may cause a problem in the process, and the physical properties of the super absorbent polymer may be deteriorated.

As the internal crosslinking agent for introducing the basic crosslinking structure into the base polymer powder, any internal crosslinking agent having a crosslinking functional group conventionally used for the production of a super absorbent polymer can be used without particular limitation. However, in order to further improve the physical properties of the super absorbent polymer by introducing an appropriate crosslinking structure into the base polymer powder, more specifically, in order to appropriately achieve physical properties of the base polymer powder described above and thus exhibit an improved liquid permeability and anti-caking properties of the super absorbent polymer, at least one selected from the group consisting of a bis(meth)acrylamide having 8 to 30 carbon atoms, a polyol poly(meta)acrylate having 2 to 30 carbon atoms and a polyol poly(meth)ally ether having 2 to 30 carbon atoms can be used as the internal crosslinking agent.

More specific examples of the internal crosslinking agent may include at least one selected from the group consisting of polyethylene glycol diacrylate (PEGDA), glycerine diacrylate, glycerin triacrylate, unmodified or ethoxylated trimethylolpropane triacrylate (ethoxylated-TMPTA), hexanediol diacrylate, and triethylene glycol diacrylate. The internal crosslinking agent can be contained at a concentration of 0.01 to 0.5% by weight with respect to the monomer mixture, thereby crosslinking the polymerized polymer.

In addition, the monomer mixture may further include a polymerization initiator that is generally used in the production of a super absorbent polymer.

Specifically, the polymerization initiator that can be used here includes a thermal polymerization initiator or a photo-polymerization initiator by UV irradiation, depending on the polymerization method. However, even in the case of using the photo-polymerization method, because a certain amount of heat is generated by the ultraviolet irradiation or the like and a certain degree of heat is generated according to the progress of the exothermic polymerization reaction, a thermal polymerization initiator may be additionally included.

The photo-polymerization initiator can be used without any limitation in its constitution as long as it is a compound capable of forming a radical by a light such as ultraviolet rays. The photo-polymerization initiator, for example, may include at least one selected from the group consisting of a benzoin ether, a dialkyl acetophenone, a hydroxyl alkylketone, a phenyl glyoxylate, a benzyl dimethyl ketal, an acyl phosphine, and an α-aminoketone. Meanwhile, specific examples of the acyl phosphine may include normal lucirin TPO, namely, 2,4,6-trimethyl-benzoyl-trimethyl phosphine oxide, or IRGACURE 819, namely, bis(2,4,6-trimethylbenzoyl)-phenyl phosphineoxide).

More various photo-polymerization initiators are well disclosed in "UV Coatings: Basics, Recent Developments and New Application" written by Reinhold Schwalm, (Elsevier, 2007), p 115, however the photo-polymerization initiator is not limited to the above-described examples.

The photo-polymerization initiator may be included in a concentration of 0.01 to 1.0% by weight based on the monomer mixture. When the concentration of the photo-polymerization initiator is excessively low, the polymerization rate may become slow, and when the concentration of the photo-polymerization initiator is excessively high, the molecular weight of the super absorbent polymer may become small and its physical properties may become uneven.

Further, as the thermal polymerization initiator, at least one selected from the group consisting of persulfate-based initiator, azo-based initiator, hydrogen peroxide and ascorbic acid can be used. Specifically, examples of the persulfate-based initiators include sodium persulfate ($Na_2S_2O_8$), potassium persulfate ($K_2S_2O_8$), ammonium persulfate (($NH_4$)$_2$$S_2O_8$) and the like, and examples of the azo-based initiator include 2,2-azobis(2-amidinopropane)dihydrochloride, 2,2-azobis-(N,N-dimethylene)isobutyramidine dihydrochloride, 2-(carbamoylazo)isobutylonitril, 2,2-azobis[2-(2-imidazolin-2-yl)propane]dihydrochloride, 4,4-azobis-(4-cyanovaleric acid) and the like.

More various thermal polymerization initiators are well disclosed in "Principle of Polymerization" written by Odian, (Wiley, 1981), p 203, however the thermal polymerization initiator is not limited to the above-described examples.

The thermal polymerization initiator can be included in the concentration of 0.001 to 0.5% by weight based on the monomer mixture. When the concentration of the thermal polymerization initiator is excessively low, the additional thermal polymerization hardly occurs and thus effects due to the addition of the thermal polymerization initiator may be insignificant, and when the concentration of the thermal polymerization initiator is excessively high, the molecular weight of the super absorbent polymer becomes small and the physical properties may become uneven.

In addition, the monomer mixture may further include additives such as a thickener, a plasticizer, a preservation stabilizer, an antioxidant, a surfactant, and so on, as needed. As the additives to be added, various additives widely used in the field of the super absorbent polymer can be used without limitation.

Meanwhile, the raw materials such as the water-soluble ethylenically unsaturated monomer, the photo-polymerization initiator, the thermal polymerization initiator, the internal crosslinking agent, and the additives can be prepared in the form of a solution which is dissolved in a solvent.

In this case, any usable solvent can be used without limitation in its constitution as long as it can dissolve the above-mentioned components. For example, one or more solvents selected from the group consisting of water, ethanol, ethyleneglycol, diethyleneglycol, triethyleneglycol, 1,4-butanediol, propyleneglycol, ethyleneglycol monobutylether, propyleneglycol monomethylether, propyleneglycol monomethylether acetate, methylethylketone, acetone, methylamylketone, cyclohexanone, cyclopentanone, diethyleneglycol monomethylether, diethyleneglycol ethylether, toluene, xylene, butylolactone, carbitol, methylcellosolve acetate, and N,N-dimethyl acetamide, and so on may be used alone or in combination with each other.

The solvent may be included in a residual amount of excluding the above-described components from the total weight of the monomer mixture.

Meanwhile, the method for forming a hydrogel polymer by the thermal polymerization or photopolymerization of such a monomer mixture is also not particularly limited by its constitution as long as it is a polymerization method commonly used in the art.

Specifically, the polymerization process of the monomer mixture may be largely classified into a thermal polymerization and a photo-polymerization depending on a polymerization energy source. The thermal polymerization may be typically carried out in a reactor like a kneader equipped with agitating spindles in order to facilitate bubble generation. In contrast, the photo-polymerization may be carried out in a reactor equipped with a movable conveyor belt. However, the above-described polymerization method is an example only, and the present invention is not limited thereto.

Further, a polymerization temperature of the monomer mixture may be controlled from about 40° C. to 90° C., thereby effectively inducing vaporization of the volatile organic solvent and polymerization of the hydrogel polymer in which pores are formed.

In this case, means for achieving the polymerization temperature within the above-described range is not particularly limited. Heating may be performed by providing a heating medium or by directly providing a heat source. The type of the heating medium that can be used herein may be a heated fluid such as steam, hot air, hot oil, etc., but is not limited thereto. Further, the temperature of the heating medium provided may be properly selected in consideration of the means of the heating medium, the temperature raising speed, and the temperature raising target temperature. Meanwhile, a heating method using electricity or a heating method using gas may be used as the heat source provided directly, but the heat source is not limited to these examples.

Further, a polymerization time of the monomer mixture may be controlled from 30 seconds to 10 minutes, thereby forming a hydrogel polymer having an optimized pore structure.

As an example, the hydrogel polymer obtained according to the thermal polymerization that is carried out in the reactor like a kneader equipped with a stirring spindle by providing hot air thereto or heating the reactor may have a particle size of several centimeters to several millimeters when it is discharged from the outlet of the reactor, according to the shape of the stirring spindle equipped in the reactor. Specifically, the size of the obtained hydrogel polymer may vary according to the concentration of the monomer mixture injected thereto, the injection speed, or the like, and generally the hydrogel polymer having a weight average particle size of 2 to 50 mm may be obtained.

Further, as described above, when the photo-polymerization is carried out in a reactor equipped with a movable conveyor belt, the obtained hydrogel polymer may be usually a sheet-like hydrogel polymer having a width of the belt. In this case, the thickness of the polymer sheet may vary depending on the concentration and the injection speed of the monomer mixture to be injected thereto, but usually, it is preferable to supply the monomer mixture so that a sheet-like polymer having a thickness of about 0.5 to about 5 cm can be obtained. When the monomer mixture is supplied to such an extent that the thickness of the sheet-like polymer becomes too thin, it is undesirable because the production efficiency is low, and when the thickness of the sheet-like polymer is more than 5 cm, the polymerization reaction cannot be evenly carried out over the entire thickness because of the excessive thickness.

In this case, the hydrogel polymer obtained by the above-mentioned method may have a water content of 40 to 80% by weight. Meanwhile, the "water content" as used herein means a weight occupied by moisture with respect to a total amount of the hydrogel polymer, which may be the value obtained by subtracting the weight of the dried polymer from the weight of the hydrogel polymer. Specifically, the water content can be defined as a value calculated by measuring the weight loss due to evaporation of moisture in the polymer in the process of drying by raising the temperature of the polymer through infrared heating. At this time, the water content is measured under the drying conditions determined as follows: the drying temperature is increased from room temperature to about 180° C. and then the temperature is maintained at 180° C., and the total drying time is set to 20 minutes, including 5 minutes for the temperature rising step.

After the monomers are subjected to a crosslinking polymerization, the base polymer powder can be obtained through steps such as drying, pulverization, classification, and the like, and through the steps such as pulverization and classification, the base polymer powder and the super absorbent polymer obtained therefrom are suitably produced and provided so as to have a particle diameter of 150 to 850 µm. More specifically, at least 95% by weight or more of the base polymer powder and the super absorbent polymer obtained therefrom has a particle diameter of 150 µm to 850 µm, and a fine powder having a particle diameter of less than 150 µm can contained in an amount of less than 3% by weight.

As described above, as the particle diameter distribution of the base polymer powder and the super absorbent polymer is adjusted within the preferable range, the super absorbent polymer finally produced can exhibit the above-mentioned physical properties more satisfactorily.

On the other hand, the method of drying, pulverization and classification will be described in more detail below.

First, when drying the hydrogel polymer, a coarsely pulverizing step may be further carried out before drying in order to increase the efficiency of the drying step, if necessary.

A pulverizing machine used here is not limited by its configuration, and specifically, it may include any one selected from the group consisting of a vertical pulverizer, a turbo cutter, a turbo grinder, a rotary cutter mill, a cutter mill, a disc mill, a shred crusher, a crusher, a chopper, and a disc cutter. However, it is not limited to the above-described examples.

In this case, the coarsely pulverizing step may be carried out so that the particle diameter of the hydrogel polymer becomes about 2 mm to about 10 mm.

Pulverizing the hydrogel polymer into a particle diameter of less than 2 mm is technically not easy due to its high water content, and agglomeration phenomenon of the pulverized particles may occur. Meanwhile, if the polymer is pulverized into a particle diameter of greater than 10 mm, the effect of increasing the efficiency in the subsequent drying step may be insignificant.

The hydrogel polymer coarsely pulverized as above or the hydrogel polymer immediately after polymerization without the coarsely pulverizing step is subjected to a drying step. In this case, the drying temperature of the drying step may be 50° C. to 250° C. When the drying temperature is less than 50° C., it is likely that the drying time becomes too long or the physical properties of the super absorbent polymer finally formed is deteriorated, and when the drying temperature is higher than 250° C., only the surface of the polymer is excessively dried, and thus it is likely that fine powder is generated during the subsequent pulverizing step, and the physical properties of the super absorbent polymer finally formed is deteriorated. Preferably, the drying can be carried out at a temperature of 150° C. to 200° C., more preferably at a temperature of 160° C. to 190° C.

Meanwhile, the drying time may be 20 minutes to 15 hours, in consideration of the process efficiency and the like, but it is not limited thereto.

In the drying step, the drying method may also be selected and used without being limited by its constitution if it is a method generally used for drying the hydrogel polymer. Specifically, the drying step may be carried out by a method such as hot air supply, infrared irradiation, microwave irradiation or ultraviolet irradiation. After the drying step as above is carried out, the water content of the polymer may be 0.05 to 10% by weight.

Subsequently, the dried polymer obtained through the drying step is subjected to a pulverization step.

The polymer powder obtained through the pulverizing step may have a particle diameter of 150 μm to 850 μm. Specific examples of a pulverizing device that can be used to achieve the above particle diameter may include a ball mill, a pin mill, a hammer mill, a screw mill, a roll mill, a disc mill, a jog mill or the like, but the present invention is not limited thereto.

Also, in order to control the physical properties of the super absorbent polymer powder finally commercialized after the pulverization step, a separate step of classifying the polymer powder obtained after the pulverization depending on the particle diameter may be undergone. Preferably, a polymer having a particle diameter of 150 μm to 850 μm is classified and only the polymer powder having such a particle diameter can be subjected to the surface crosslinking reaction and finally commercialized.

On the other hand, after performing the step of forming the base polymer powder described above, the method for producing the super absorbent polymer of the one embodiment may include a step of heat-treating and surface-crosslinking the base polymer powder in the presence of a surface crosslinking solution containing aluminum sulfate and a surface crosslinking agent.

At this time, since the kind of the surface crosslinking agent, the aluminum sulfate and the content thereof have already been described with respect to the super absorbent polymer of one embodiment, additional explanation relating thereto will be omitted. For reference, the content of the aluminum sulfate in the surface crosslinking solution may correspond to the content of the aluminum sulfate in the super absorbent polymer of the embodiment described above.

Further, the surface crosslinking solution may include at least one solvent selected from the group consisting of water, ethanol, ethylene glycol, diethylene glycol, triethylene glycol, 1,4-butanediol, propylene glycol, ethylene glycol monobutyl ether, propylene glycol monomethyl ether, propylene glycol monomethyl ether acetate, methyl ethyl ketone, acetone, methyl amyl ketone, cyclohexanone, cyclopentanone, diethylene glycol monomethyl ether, diethylene glycol ethylether, toluene, xylene, butyrolactone, carbitol, methyl cellosolve acetate, and N,N-dimethylacetamide.

Further, as already mentioned above, in the surface crosslinked layer of the super absorbent polymer of one embodiment, alumina may be further optionally contained together with aluminum sulfate.

To this end, the surface crosslinking solution may further include alumina. The content of alumina in the surface crosslinking solution may also correspond to the content of alumina in the surface crosslinked layer of the super absorbent polymer of one embodiment.

Further, the surface crosslinking agent contained in the surface crosslinking solution can be used in an amount of 0.01 to 4 parts by weight based on 100 parts by weight of the base polymer powder.

Moreover, in the step of forming the surface crosslinked layer, the surface crosslinking solution may further contain a thickener. If the surface of the base polymer powder is further crosslinked in the presence of the thickener as described above, it is possible to minimize the deterioration of physical properties even after the pulverization.

More specifically, as the thickener, at least one selected from a polysaccharide and a hydroxy-containing polymer may be used.

Among them, the polysaccharide may be a gum type thickener, a cellulose type thickener and the like. Specific examples of the gum type thickener include xanthan gum, arabic gum, karaya gum, tragacanth gum, ghatti gum, guar gum, locust bean gum, psyllium seed gum and the like. Specific examples of the cellulose type thickener include hydroxypropylmethyl cellulose, carboxymethyl cellulose, methylcellulose, hydroxymethyl cellulose, hydroxyethyl cellulose, hydroxypropyl cellulose, hydroxyethylmethyl cellulose, hydroxymethylpropyl cellulose, hydroxyethylhydroxypropyl cellulose, ethylhydroxyethyl cellulose, methylhydroxypropyl cellulose, and the like. Meanwhile, specific examples of the hydroxy-containing polymer include polyethylene glycol, polyvinyl alcohol, and the like.

The surface crosslinking solution may further include a thermal initiator such as $Na_2S_2O_5$ so that the surface crosslinking reaction may occur more smoothly depending on the kind of the surface crosslinking solution, and may further include a commercially available discoloration inhibitor.

On the other hand, the surface crosslinking step can be carried out by heat-treating the base polymer powder at 100° C. or higher in the presence of the surface crosslinking solution. In particular, in order to produce a super absorbent polymer having good physical properties, the surface crosslinking step may be carried out at a temperature of 100° C. to 180° C. for 10 minutes to 60 minutes. In a specific example, the maximum reaction temperature may be 100° C. or higher, or about 120° C. to 180° C., and the holding time at the maximum reaction temperature may be 10 minutes or more.

Meanwhile, the temperature raising means for the surface crosslinking reactions is not particularly limited. The heating can be carried out by providing a heating medium or directly providing a heating source. The type of heat medium that can be used here includes a heated fluid such as steam, hot air, hot oil, etc., but it is not limited thereto. Further, the temperature of the heating medium to be provided can be appropriately selected in consideration of the means of the heating medium, the temperature raising speed, and the temperature raising target temperature. Meanwhile, a heat source to be provided directly may include a heating method using electricity or a heating method using gas, but is not limited to the above-described examples.

After the surface crosslinking step described above, the step of dry mixing alumina on the surface crosslinked super absorbent polymer particles may be carried out. In this case, the amount of alumina used may correspond to the content of alumina on the surface crosslinked layer of the superabsorbent polymer of the embodiment described above.

The kind of alumina that can be used is already described above, and the method for adding such alumina on the super absorbent polymer particles is not limited by its constitution.

For example, a method of adding alumina and super absorbent polymer particles to a reaction tank and dry mixing it, or a method of continuously supplying and mixing the super absorbent polymer particles and alumina into a continuously operated mixer, or the like can be used.

ADVANTAGEOUS EFFECTS

According to the present invention, a super absorbent polymer which exhibits more improved liquid permeability while basically maintaining excellent absorption performance, and suppresses aggregation and caking of particles even under high temperature/high humidity conditions, and a method for producing the same can be provided.

Such super absorbent polymer is preferably used for hygienic materials such as diapers in which the pulp content is reduced or the pulp is not used, thereby exhibiting excellent performance.

EXAMPLES

Hereinafter, preferred examples are provided for better understanding of the invention. However, these Examples are given for illustrative purposes only and are not intended to limit the scope of the present invention thereto.

In the following Examples and Comparative Examples, the physical properties of the respective super absorbent polymers (or base polymer powders) were measured and evaluated by the following methods.

(1) Evaluation of Particle Diameter

The particle diameter of the super absorbent polymer used in Examples and Comparative Examples was measured in accordance with EDANA (European Disposables and Nonwovens Association) recommended test method No. WSP 220.3.

(2) Centrifuge Retention Capacity (CRC)

The centrifuge retention capacity (CRC) by water absorption capacity under a non-loading condition was measured for the super absorbent polymers of Examples and Comparative Examples in accordance with EDANA (European Disposables and Nonwovens Association) recommended test method No. WSP 241.3.

That is, $W_0$ (g, about 0.2 g) of the super absorbent polymer was uniformly put in a nonwoven fabric-made bag, followed by sealing. Then, the bag was immersed in a physiological saline solution composed of 0.9 wt % aqueous sodium chloride solution at room temperature. After 30 minutes, water was removed from the bag by centrifugation at 250 G for 3 minutes, and the weight $W_2(g)$ of the bag was then measured. Further, the same procedure was carried out without using the super absorbent polymer, and then the resultant weight $W_1(g)$ was measured.

Using the respective weights thus obtained, CRC (g/g) was calculated according to the following Equation 3, thereby confirming the centrifuge retention capacity.

$$CRC(g/g) = \{[W_2(g) - W_1(g) - W_0(g)] / W_0(g)\} \qquad \text{[Equation 3]}$$

in Equation 3, $W_0(g)$ is an initial weight(g) of the super absorbent polymer, $W_1(g)$ is the weight of the device not including the super absorbent polymer, measured after immersing and absorbing the same into a physiological saline solution for 30 minutes and then dehydrating the same by using a centrifuge at 250G for 3 minutes, and $W_2(g)$ is the weight of the device including the super absorbent polymer, measured after immersing and absorbing the super absorbent polymer into a physiological saline solution at room temperature for 30 minutes and then dehydrating the same by using a centrifuge at 250G for 3 minutes.

(3) Absorbency Under Pressure (AUP)

The absorbency under pressure (AUP) was measured for each super absorbent polymer of Examples and Comparative Examples according to EDANA (European Disposables and Nonwovens Association) recommended test method No. WSP 242.3.

First, a 400 mesh metal made of stainless steel was installed at the bottom of a plastic cylinder having an inner diameter of 60 mm. $W_0(g$, about 0.90 g) of the polymer obtained in Examples and Comparative Examples were uniformly scattered on the screen under conditions of a temperature of 23±2° C. and a relative humidity of 45%. Then, a piston capable of uniformly providing a load of 4.83 kPa (0.7 psi) was put thereon, in which the external diameter of the piston was slightly smaller than 60 mm, there was no gap between the internal wall of the cylinder and the piston, and the jig-jog of the cylinder was not interrupted. At this time, the weight $W_3(g)$ of the device was measured.

A glass filter having a diameter of 125 mm and a thickness of 5 mm was placed in a Petri dish having the diameter of 150 mm, and then a physiological saline solution composed of 0.90 wt % of sodium chloride was poured in the dish until the surface level became equal to the upper surface of the glass filter. A sheet of filter paper having a diameter of 120 mm was put thereon. The measuring device was put on the filter paper and the solution was absorbed for 1 hour under a load. After 1 hour, the weight $W_4(g)$ was measured after lifting up the measuring device.

Using the weights thus obtained, the AUP (g/g) was calculated according to the following Equation 4, thereby confirming the absorbency under pressure:

$$AUP(g/g) = [W_4(g) - W_3(g)] / W_0(g) \qquad \text{[Equation 4]}$$

in Equation 4, $W_0(g)$ is an initial weight (g) of the super absorbent polymer, $W_3(g)$ is the total sum of a weight of the super absorbent polymer and a weight of the device capable of providing a load to the super absorbent polymer, and $W_4(g)$ is the total sum of a weight of the super absorbent polymer and a weight of the device capable of providing a load to the super absorbent polymer, after absorbing a physiological saline solution to the super absorbent polymer under a load (0.3 or 0.7 psi) for 1 hour.

(4) Permeability

Permeability was measured by using a 0.9% saline solution under a load of 0.3 psi according to the method disclosed in the literature (Buchholz, F. L. and Graham, A. T., "Modern Superabsorbent Polymer Technology," John Wiley & Sons (1998), page 161).

More specific measurement method is described as follows. 0.2 g of particles having a particle size of 300 to 600 μm were taken from the super absorbent polymers (hereinafter, referred to as a sample) prepared in Examples and Comparative Examples, and added to a cylinder (Φ20 mm), wherein the cylinder has a stopcock on one end, an upper limit mark and a lower limit mark thereon. The upper limit mark on the cylinder is indicated at the position of which 40 ml of (saline) solution is filled into the cylinder, and the lower limit mark on the cylinder is indicated at the position of which 20 ml of (saline) solution is filled into the cylinder.

50 g of 0.9% saline (NaCl) solution was added to the cylinder with the stopcock in a closed position, and left for 30 minutes. Then, if necessary, additional saline solution is added to the cylinder to bring the level of saline solution to the upper limit mark on the cylinder. Then, the cylinder including the saline-absorbed super absorbent polymers is pressurized with a load of 0.3 psi, and left for 1 minute. Thereafter, the stopcock at the bottom of the cylinder was open to measure the time taken for the 0.9% saline solution to pass from the upper limit mark to the lower limit mark on the cylinder. All measurements were carried out at a temperature of 24±1° C. and relative humidity of 50±10%.

The time taken to pass from the upper limit mark to the lower limit mark was measured for respective samples ($T_S$) and also measured in the absence of the super absorbent polymers ($T_0$), and permeability was calculated by the following Equation 1:

$$\text{Permeability (sec)} = T_S - T_0 \quad \text{[Equation 1]}$$

wherein:

$T_S$ (unit:sec) means the time required for allowing a 0.9% saline (NaCl) solution to permeate a saline-absorbed super absorbent polymer under a load of 0.3 psi, wherein the saline-absorbed super absorbent polymer is prepared by swelling 0.2 g of super absorbent polymer with the 0.9% saline solution for 30 minutes, and $T_0$ (unit:sec) means the time required for allowing the 0.9% saline solution to permeate under a load of 0.3 psi in the absence of the saline-absorbed super absorbent polymer.

(5) Anti-Caking Efficiency (A/C Efficiency)

2 g ($W_5$) of the super absorbent polymer produced in Examples and Comparative Examples were uniformly applied to a 10 cm diameter flask dish, and then kept in a constant-temperature and constant-humidity chamber that is maintained at a temperature of 40±3° C. and a humidity of 80±3% for 10 minutes. Then, the flask dish is reversed on a filter paper and tapping is performed three times. Thereby, the amount ($W_6$) at which the super absorbent polymer falls is measured.

Using the weight thus measured, the anti-caking efficiency was calculated according to the following Equation 2. The higher the value, the better the efficiency.

$$\text{Anti-caking efficiency (\%)} = [W_6(g)/W_0(g)] * 100 \quad \text{[Equation 2]}$$

in Equation 2, $W_0(g)$ is an initial weight(g) of the super absorbent polymer, and $W_6(g)$ is the amount (g) at which the super absorbent polymer falls after uniformly applying to a 10 cm diameter flask dish, keeping for 10 minutes in a constant-temperature and constant-humidity chamber which is maintained at a temperature of 40±3° C. and a humidity of 80±3%, and then reversing a flask dish on a filter paper and tapping three times.

(6) Absorption Rate (Vortex Test)

50 mL of a 0.9 wt % NaCl solution was put in a 100 mL beaker, and then 2 g of each super absorbent polymer prepared in Examples and Comparative Examples was added thereto while stirring at 600 rpm using a stirrer. Then, the vortex time was calculated by measuring the amount of time until a vortex of the liquid caused by the stirring disappeared and a smooth surface was formed, and the result was shown as the vortex removal time.

Production Example 1: Production of Base Polymer Powder A 450 g of acrylic acid was added to a 2 L glass beaker, to which 693.88 g of a 24% caustic soda aqueous solution was slowly poured and mixed to prepare a first solution. At this time, neutralization heat was generated, and the mixed solution was stirred at room temperature and cooled to about 41° C. Subsequently, a second solution prepared by adding 0.225 g of polyethylene glycol diacrylate (PEGDA 600), 0.16 g of a surfactant (S1670) and 0.045 g of dioctyl sulfosuccinate sodium salt (AOT) to 50 g of acrylic acid; 26 g of a 4% aqueous solution of sodium bicarbonate ($NaHCO_3$) (third solution); 35 g of a 0.31% aqueous solution of ascorbic acid (fourth solution); and a solution (fifth solution) prepared by diluting 1 g of hydrogen peroxide and 0.69 g of potassium persulfate in 40 g of distilled water were sequentially added to the first solution.

When the solution stirred in the beaker was gelled and stirring was stopped, the solution was immediately poured in a Vat-type tray (15 cm in width×15 cm in length). The poured gel was foamed at about 20 seconds, polymerized and slowly shrunk. The sufficiently shrunk polymer was torn into 5 to 10 pieces and transferred into a kneader. The lid was closed and kneading was carried out for 5 minutes. In the kneading process, the lid was opened at the lapse of 4 minutes from the beginning, and 50 g of 3.5% aqueous solution of potassium persulfate was sprayed onto the polymer inside the kneader, and then the lid was closed.

Thereafter, the polymer was passed through a hole having a diameter of 13 mm using a meat chopper to prepare crumbs.

Then, the crumbs were dried in an oven capable of shifting airflow up and down. The crumbs were uniformly dried by flowing hot air at 180° C. from the bottom to the top for 15 minutes and from the top to the bottom for 15 minutes, so that the dried product had a water content of about 2% or less.

Subsequently, the dried crumbs were pulverized using a pulverizer and classified to obtain a base polymer powder A having a particle diameter of 150 to 850 μm. Such base polymer powder A was found to exhibit a centrifuge retention capacity (CRC) of 31 g/g and a vortex removal time of 27 seconds.

Production Example 2: Production of Base Polymer Powder B 450 g of acrylic acid was added to a 2 L glass beaker, to which 693.88 g of a 24% caustic soda aqueous solution was slowly poured and mixed to prepare a first solution. At this time, neutralization heat was generated, and the mixed solution was stirred at room temperature and cooled to about 41° C. Subsequently, a second solution prepared by adding 0.225 g of polyethylene glycol diacrylate (PEGDA 600), 0.16 g of a surfactant (S1670) and 0.045 g of dioctyl sulfosuccinate sodium salt (AOT) to 50 g of acrylic acid; 26 g of a 4% aqueous solution of sodium bicarbonate ($NaHCO_3$) (third solution); 35 g of a 0.31% aqueous solution of ascorbic acid (fourth solution); and a solution (fifth solution) prepared by diluting 1 g of hydrogen peroxide and 0.69 g of potassium persulfate in 40 g of distilled water were sequentially added to the first solution.

When the solution stirred in the beaker was gelled and stirring was stopped, the solution was immediately poured in a Vat-type tray (15 cm in width×15 cm in length). The poured gel was foamed at about 20 seconds, polymerized and slowly shrunk. The sufficiently shrunk polymer was torn into 5 to 10 pieces and transferred into a kneader. The lid was closed and kneading was carried out for 5 minutes. In the kneading process, the lid was opened at the lapse of 4 minutes from the beginning, and 50 g of 3.5% aqueous solution of potassium persulfate was sprayed onto the polymer inside the kneader, and then the lid was closed.

Thereafter, the polymer was passed through a hole having a diameter of 13 mm using a meat chopper to prepare crumbs.

Then, the crumbs were dried in an oven capable of shifting airflow up and down. The crumbs were uniformly dried by flowing hot air at 180° C. from the bottom to the top for 15 minutes and from the top to the bottom for 15 minutes, so that the dried product had a water content of about 2% or less.

Subsequently, the dried crumbs were pulverized using a pulverizer and classified to obtain a base polymer powder B having a particle diameter of 150 to 850 μm. Such base polymer powder B was found to exhibit a centrifuge retention capacity (CRC) of 37 g/g and a vortex removal time of 39 seconds.

Example 1: Production of Super Absorbent Polymer 150 g of the base polymer powder A obtained in Production Example 1 was added to a high speed mixer to obtain a surface crosslinking solution with the following composition.

The surface crosslinking solution was that prepared by mixing 3.6 wt % of water, 3.6 wt % of methanol, 0.2 wt % of polyethylene glycol diglycidyl ester (EX810), 0.03 wt % of aluminum sulfate (Al2(SO4)) in a 23% aqueous solution, 0.03 wt % of alumina (trade name: Alu 130), 0.05 wt % of Na2S2O5 as a thermal initiator and 0.05 wt % of a discoloration inhibitor (trade name: Blancolen® HP), with respect to the base polymer powder.

Such surface crosslinking solution was added to the high speed mixer, and then stirred at 400 rpm for 30 seconds. Then, the surface cross-linking reaction was carried out at 135° C. for 35 minutes.

Then, 0.1 wt % of alumina (trade name: Alu 130) was further added and mixed with respect to the result of the surface crosslinking, and the resultant product was classified using a US standard 20 mesh screen and a US standard 170 mesh screen, thereby obtaining a super absorbent polymer having a particle diameter of 150 to 850 μm.

The permeability, CRC, 0.3 AUP, 0.7 AUP, anti-caking efficiency and vortex removal time of such super absorbent polymer were measured, and the results are summarized in Table 1 below.

Example 2: Production of Super Absorbent Polymer

A super absorbent polymer of Example 2 was produced in the same manner as in Example 1, except that 0.05 wt % of aluminum sulfate (Al2(SO4)) in a 23% aqueous solution was used with respect to the base polymer powder in the composition of the surface crosslinking solution.

The permeability, CRC, 0.3 AUP, 0.7 AUP, anti-caking efficiency and vortex removal time of such super absorbent polymer were respectively measured, and the results are summarized in Table 1 below.

Example 3: Production of Super Absorbent Polymer

A super absorbent polymer of Example 3 was produced in the same manner as in Example 1, except that 0.07 wt % of aluminum sulfate (Al2(SO4)) in a 23% aqueous solution was used with respect to the base polymer powder in the composition of the surface crosslinking solution.

The permeability, CRC, 0.3 AUP, 0.7 AUP, anti-caking efficiency and vortex removal time of such super absorbent polymer were respectively measured, and the results are summarized in Table 1 below.

Example 4: Production of Super Absorbent Polymer 150 g of the base polymer powder B obtained in Production Example 2 was added to a high speed mixer to obtain a surface crosslinking solution with the following composition.

The surface crosslinking solution was that prepared by mixing 3.4 wt % of water, 3.4 wt % of methanol, 0.15 wt % of polyethylene glycol diglycidyl ester (EX810), 0.15 wt % of aluminum sulfate (Al2(SO4)) in a 23% aqueous solution, and 0.05 wt % of Na2S2O5 as a thermal initiator, with respect to the base polymer powder.

Such surface crosslinking solution was added to the high speed mixer, and then stirred at 400 rpm for 30 seconds. Then, the surface cross-linking reaction was carried out at 140° C. for 35 minutes.

Then, 0.1 wt % of alumina (trade name: Alu 130) was further added and mixed with respect to the result of the surface crosslinking, and the resultant product was classified using a US standard 20 mesh screen and a US standard 170 mesh screen, thereby obtaining a super absorbent polymer having a particle diameter of 150 to 850 μm.

The permeability, CRC, 0.3 AUP, 0.7 AUP, anti-caking efficiency and vortex removal time of such super absorbent polymer were measured, and the results are summarized in Table 1 below.

Example 5: Production of Super Absorbent Polymer

A super absorbent polymer of Example 5 was produced in the same manner as in Example 4, except that 0.05 wt % of alumina (trade name: Alu C) was further used with respect to the result of the surface crosslinking.

The permeability, CRC, 0.3 AUP, 0.7 AUP, anti-caking efficiency and vortex removal time of such super absorbent polymer were measured, and the results are summarized in Table 1 below.

Example 6: Production of Super Absorbent Polymer

A super absorbent polymer of Example 6 was produced in the same manner as in Example 4, except that 0.1 wt % of alumina (trade name: Alu C) was further used for the result of the surface crosslinking.

The permeability, CRC, 0.3 AUP, 0.7 AUP, anti-caking efficiency and vortex removal time of such super absorbent polymer were measured, and the results are summarized in Table 1 below.

Example 7: Production of Super Absorbent Polymer

A super absorbent polymer of Example 7 was produced in the same manner as in Example 4, except that 0.15 wt % of alumina (trade name: Alu C) was further used for the result of the surface crosslinking.

The permeability, CRC, 0.3 AUP, 0.7 AUP, anti-caking efficiency and vortex removal time of such super absorbent polymer were measured, and the results are summarized in Table 1 below.

Comparative Example 1: Production of Super Absorbent Polymer

A super absorbent polymer of Comparative Example 1 was produced in the same manner as in Example 4, except that alumina was not added with respect to the result of the surface crosslinking.

The permeability, CRC, 0.3 AUP, 0.7 AUP, anti-caking efficiency and vortex removal time of such super absorbent polymer were measured, and the results are summarized in Table 1 below.

Comparative Example 2: Production of Super Absorbent Polymer 150 g of the base polymer powder B obtained in Production Example 2 was added to a high speed mixer to obtain a surface crosslinking solution with the following composition.

The surface crosslinking solution was that prepared by mixing 3.7 wt % of water, 4 wt % of methanol, 0.03 wt % of polyethylene glycol diglycidyl ester (EX810) and 0.05 wt % of a polycarbonate-based polymer, with respect to the base polymer powder.

Such surface crosslinking solution was added to the high speed mixer, and then stirred at 400 rpm for 30 seconds. Then, the surface cross-linking reaction was carried out at 140° C. for 35 minutes.

The permeability, CRC, 0.3 AUP, 0.7 AUP, anti-caking efficiency and vortex removal time of such super absorbent polymer were measured, and the results are summarized in Table 1 below.

Comparative Example 3: Production of Super Absorbent Polymer

A super absorbent polymer of Comparative Example 3 was produced in the same manner as in Example 1, except that a 22% aqueous solution of aluminum trilactate was used instead of a 23% aqueous solution of aluminum sulfate $(Al_2(SO_4))$ in the composition of the surface crosslinking solution.

The permeability, CRC, 0.3 AUP, 0.7 AUP, anti-caking efficiency and vortex removal time of such super absorbent polymer were measured, and the results are summarized in Table 1 below.

Referring to Table 1 above, it is confirmed that the super absorbent polymers of Examples exhibit superior liquid permeability (permeability) and anti-caking efficiency, while exhibiting absorption performance (CRC and AUP) and absorption rate (vortex removal time) equal to or higher than those of the Comparative Examples.

The invention claimed is:

1. A super absorbent polymer comprising:
   a base polymer powder including a first crosslinked polymer of a water-soluble ethylenically unsaturated monomer having at least partially neutralized acidic groups, crosslinked by an internal crosslinking agent comprising a polyol-based compound; and
   a surface crosslinked layer formed on the base polymer powder and including a second crosslinked polymer in which the first crosslinked polymer is further crosslinked via a surface crosslinking agent comprising a polyol-based compound,
   wherein the super absorbent polymer includes aluminum sulfate dispersed in the surface crosslinked layer and alumina dispersed on the surface crosslinked layer,
   wherein the aluminum sulfate is contained in an amount of 0.02 to 0.15 parts by weight based on 100 parts by weight of the base polymer powder, and
   wherein the alumina is contained in an amount of 0.03 to 0.2 parts by weight based on 100 parts by weight of the base polymer powder.

2. The super absorbent polymer according to claim 1, wherein the surface crosslinking agent further includes at least one selected from the group consisting of an alkylene carbonate-based compound, and a polyvalent epoxy-based compound.

3. The super absorbent polymer according to claim 1, wherein the super absorbent polymer further includes alumina dispersed in the surface crosslinked layer.

4. The super absorbent polymer according to claim 1, wherein a permeability measured and calculated by the method of the following Equation 1 is 10 to 80 seconds,
   a centrifuge retention capacity for a physiological saline solution comprising 0.9 wt % aqueous sodium chloride for 30 minutes is 28 g/g to 36 g/g,
   an absorbency under pressure for the physiological saline solution under 0.3 psi for 1 hour is 20 to 33 g/g, and

TABLE 1

| | CRC (g/g) | 0.3 AUP (g/g) | 0.7 AUP (g/g) | Permeability (sec) | Anti-caking efficiency (%) | Vortex removal time (sec) |
|---|---|---|---|---|---|---|
| Example 1 | 31.1 | 25.6 | 14.9 | 68 | 80 | 27 |
| Example 2 | 31.5 | 27 | 15.9 | 46 | 92 | 27 |
| Example 3 | 31.6 | 26.4 | 13.7 | 49 | 95 | 27 |
| Example 4 | 29.9 | 27.5 | 20.1 | 15 | 75 | 27 |
| Example 5 | 29.7 | 28.8 | 20 | 21 | 86 | 25 |
| Example 6 | 29.9 | 28.4 | 18.6 | 17 | 96 | 27 |
| Example 7 | 29.3 | 28.2 | 18.9 | 15 | 97 | 25 |
| Comparative Example 1 | 29.6 | 29.6 | 20.8 | 80 | 65 | 27 |
| Comparative Example 2 | 30.2 | 21.5 | 16.3 | 112 | 23 | 37 |
| Comparative Example 3 | 30.5 | 25 | 13.9 | 80 | 66 | 27 | an anti-caking efficiency of the following Equation 2 is 75% to 100%:

Permeability(sec)=$T_S-T_0$     [Equation 1]

in Equation 1,
$T_S$ means the time in seconds required for allowing the physiological saline solution to permeate a saline-absorbed super absorbent polymer under a load of 0.3 psi, wherein the saline-absorbed super absorbent polymer is prepared by swelling 0.2 g of super absorbent polymer with the physiological saline solution for 30 minutes, and
$T_0$ means the time in seconds required for allowing the physiological saline solution to permeate under a load of 0.3 psi in the absence of the saline-absorbed super absorbent polymer, and Anti-caking efficiency (%)=$[W_6(g)/W_0(g)]*100$     [Equation 2]

in Equation 2,
$W_0(g)$ is an initial weight in grams of the super absorbent polymer, and $W_6(g)$ is the amount in grams at which the super absorbent polymer falls after uniformly applying to a 10 cm diameter flask dish, keeping for 10 minutes in a constant-temperature and constant-humidity chamber which is maintained at a temperature of 40±3° C. and a humidity of 80±3%, and then reversing a flask dish on a filter paper and tapping three times.

5. The super absorbent polymer according to claim 4, wherein the super absorbent polymer has a vortex removal time of 25 to 35 seconds.

6. The super absorbent polymer according to claim 4, wherein the superabsorbent polymer has an absorbency under pressure for the physiological saline solution under 0.7 psi for 1 hour of 10 to 25 g/g.

7. A super absorbent polymer comprising:
a base polymer powder including a first crosslinked polymer of a water-soluble ethylenically unsaturated monomer having at least partially neutralized acidic groups, crosslinked by an internal crosslinking agent comprising a polyol-based compound; and
a surface crosslinked layer formed on the base polymer powder and including a second crosslinked polymer in which the first crosslinked polymer is further crosslinked via a surface crosslinking agent comprising a polyol-based compound,
wherein the super absorbent polymer includes aluminum sulfate dispersed in the surface crosslinked layer and alumina dispersed on the surface crosslinked layer,
wherein the aluminum sulfate is contained in an amount of 0.02 to 0.15 parts by weight based on 100 parts by weight of the base polymer powder,
wherein the alumina is contained in an amount of 0.03 to 0.2 parts by weight based on 100 parts by weight of the base polymer powder, and
wherein a permeability measured and calculated by the method of the following Equation 1 is 10 to 70 seconds, and
an anti-caking efficiency of the following Equation 2 is 75% to 100%:

Permeability(sec)=$T_S-T_0$     [Equation 1]

in Equation 1,
$T_S$ means the time in seconds required for allowing a physiological saline solution comprising 0.9 wt % aqueous sodium chloride to permeate a saline-absorbed super absorbent polymer under a load of 0.3 psi, wherein the saline-absorbed super absorbent polymer is prepared by swelling 0.2 g of super absorbent polymer with the physiological saline solution for 30 minutes, and
$T_0$ means the time in seconds required for allowing the physiological saline solution to permeate under a load of 0.3 psi in the absence of the saline-absorbed super absorbent polymer, and Anti-caking efficiency (%)=$[W_6(g)/W_0(g)]*100$     [Equation 2]

in Equation 2,
$W_0(g)$ is an initial weight in grams of the super absorbent polymer, and $W_6(g)$ is the amount in grams at which the super absorbent polymer falls after uniformly applying to a 10 cm diameter flask dish, keeping for 10 minutes in a constant-temperature and constant-humidity chamber which is maintained at a temperature of 40±3° C. and a humidity of 80±3%, and then reversing a flask dish on a filter paper and tapping three times.

8. A method for producing a super absorbent polymer according to claim 1 comprising the steps of:
performing crosslinking polymerization of a water-soluble ethylenically unsaturated monomer having at least partially neutralized acidic groups in the presence of an internal crosslinking agent to form a hydrogel polymer containing a first crosslinked polymer;
drying, pulverizing and classifying the hydrogel polymer to form a base polymer power;
heat-treating and surface-crosslinking the base polymer powder in the presence of a surface crosslinking solution containing aluminum sulfate and a surface crosslinking agent to form a super absorbent polymer particle; and
dry mixing alumina on the super absorbent polymer particle,
wherein the aluminum sulfate is contained in an amount of 0.02 to 0.15 parts by weight based on 100 parts by weight of the base polymer powder, and
wherein the alumina is contained in an amount of 0.03 to 0.2 parts by weight based on 100 parts by weight of the base polymer powder.

9. The method for producing a super absorbent polymer according to claim 8, wherein the water-soluble ethylenically unsaturated monomer includes at least one selected from the group consisting of anionic monomers of acrylic acid, methacrylic acid, maleic anhydride, fumaric acid, crotonic acid, itaconic acid, 2-acryloylethanesulfonic acid, 2-methacryloylethanesulfonic acid, 2-(meth)acryloylpropanesulfonic acid or 2-(meth)acrylamido-2-methylpropanesulfonic acid, and their salts; non-ionic, hydrophilic group-containing monomers of (meth)acrylamide, N-substituted (meth)acrylate, 2-hydroxyethyl(meth)acrylate, 2-hydroxypropyl(meth)acrylate, methoxypolyethylene glycol(meth)acrylate or polyethylene glycol (meth)acrylate; and amino group-containing unsaturated monomers of (N,N)-dimethylaminoethyl(meth)acrylate or (N,N)-dimethylaminopropyl (meth)acrylamide, and their quaternary product.

10. The method for producing a super absorbent polymer according to claim 8, wherein the internal crosslinking agent includes at least one selected from the group consisting of atoms, a polyol poly(meta)acrylate having 2 to 30 carbon atoms and a polyol poly(meth)ally ether having 2 to 30 carbon atoms.

11. The method for producing a super absorbent polymer according to claim 8, wherein the base polymer powder is pulverized and classified so as to have a particle diameter of 150 to 850 μm.

12. The method for producing a super absorbent polymer according to claim 8, wherein the surface crosslinking agent further includes at least one selected from the group consisting of, an alkylene carbonate-based compound, and a polyvalent epoxy-based compound.

13. The method for producing a super absorbent polymer according to claim 8, wherein the surface crosslinking solution further includes alumina.

14. The method for producing a super absorbent polymer according to claim 8, wherein the surface crosslinking solution further includes a thermal initiator and a discoloration inhibitor.

15. The method for producing a super absorbent polymer according to claim 8, wherein the surface crosslinking is carried out at a temperature of 100° C. to 180° C. for 10 minutes to 60 minutes.

\* \* \* \* \*